US010642061B2

(12) United States Patent
Wang et al.

(10) Patent No.: US 10,642,061 B2
(45) Date of Patent: May 5, 2020

(54) DISPLAY PANEL AND DISPLAY APPARATUS

(71) Applicant: BOE Technology Group Co., Ltd., Beijing (CN)

(72) Inventors: Wei Wang, Beijing (CN); Yafeng Yang, Beijing (CN); Xiaochuan Chen, Beijing (CN); Can Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 15/751,558

(22) PCT Filed: Jul. 6, 2017

(86) PCT No.: PCT/CN2017/092018
§ 371 (c)(1),
(2) Date: Feb. 9, 2018

(87) PCT Pub. No.: WO2018/076775
PCT Pub. Date: May 3, 2018

(65) Prior Publication Data
US 2019/0196209 A1    Jun. 27, 2019

(30) Foreign Application Priority Data
Oct. 31, 2016  (CN) .......................... 2016 1 0966210

(51) Int. Cl.
*G09G 5/00* (2006.01)
*G02B 30/27* (2020.01)
(Continued)

(52) U.S. Cl.
CPC ......... *G02B 30/27* (2020.01); *G02B 27/0101* (2013.01); *G02B 30/34* (2020.01);
(Continued)

(58) Field of Classification Search
CPC ................ G02B 27/0093; G02B 27/01; G02B 27/0101; G02B 27/017; G02B 27/0178;
(Continued)

(56) References Cited

U.S. PATENT DOCUMENTS 8,964,009 B2    2/2015  Yoshida
9,368,070 B2 *  6/2016  Jepsen .................. G06F 3/1446
(Continued)

FOREIGN PATENT DOCUMENTS

| CN | 1172267 A | 2/1998 |
|----|-----------|--------|
| CN | 102472898 A | 5/2012 |

(Continued)

OTHER PUBLICATIONS

International Search Report and English translation of International Search Report for International Application No. PCT/CN2017/092018, dated Oct. 11, 2017, 10 pages.

(Continued)

*Primary Examiner* — Joe H Cheng
(74) *Attorney, Agent, or Firm* — Westman, Champlin & Koehler, P.A.

(57) ABSTRACT

The present disclosure discloses a display panel and a display apparatus. The display panel comprises a first display region and a driving circuit. The first display region comprises at least two sets of display units, each set of display units comprising at least one display unit. All the display units of the first display region are configured to generate light rays that are to be converged onto a same eye of a user. All the display units that belong to a same set of display units are configured to generate light rays that are to be converged onto a same viewpoint of a same eye of the user, and the display unit that belong to different sets of display units are configured to generate light rays that are to be converged respectively onto different viewpoints of a (Continued)

same eye of the user. The driving circuit drives the display units of the at least two sets of display units, so that the at least two sets of display units display pictures representing a same scene to be displayed and viewed at the respective viewpoints.

17 Claims, 5 Drawing Sheets

(51) Int. Cl.
| | |
|---|---|
| *H04N 13/312* | (2018.01) |
| *H04N 13/133* | (2018.01) |
| *H04N 13/324* | (2018.01) |
| *G02B 27/01* | (2006.01) |
| *H04N 13/344* | (2018.01) |
| *H04N 13/307* | (2018.01) |
| *G02B 30/34* | (2020.01) |
| *G02B 30/36* | (2020.01) |

(52) U.S. Cl.
CPC .......... *G02B 30/36* (2020.01); *H04N 13/133* (2018.05); *H04N 13/307* (2018.05); *H04N 13/312* (2018.05); *H04N 13/324* (2018.05); *H04N 13/344* (2018.05)

(58) Field of Classification Search
CPC .............. G02B 27/22; G02B 27/2207; G02B 27/2228; H04N 13/00; H04N 13/133; H04N 13/324; H04N 13/366
See application file for complete search history.

(56) References Cited

U.S. PATENT DOCUMENTS

| | | | |
|---|---|---|---|
| 9,813,695 B2 | 11/2017 | Kroon et al. | |
| 2010/0118125 A1* | 5/2010 | Park .................. | G06K 9/32 348/46 |
| 2010/0123952 A1 | 5/2010 | Chen et al. | |
| 2012/0019908 A1 | 1/2012 | Choi et al. | |
| 2012/0182407 A1 | 7/2012 | Yoshida | |
| 2012/0293407 A1* | 11/2012 | Lee ................... | G02B 27/017 345/156 |
| 2013/0181895 A1 | 7/2013 | Kim et al. | |
| 2013/0258461 A1* | 10/2013 | Sato .................. | G02B 27/01 359/464 |
| 2013/0285885 A1* | 10/2013 | Nowatzyk ........... | G02B 3/0006 345/8 |
| 2014/0036360 A1 | 2/2014 | Sakamoto et al. | |
| 2014/0125957 A1* | 5/2014 | Lee ................... | G02B 27/2264 353/37 |
| 2014/0168783 A1* | 6/2014 | Luebke .............. | G02B 3/0006 359/630 |
| 2014/0204078 A1 | 7/2014 | Chen et al. | |
| 2014/0300711 A1 | 10/2014 | Kroon et al. | |
| 2014/0327750 A1* | 11/2014 | Malachowsky ........ | H04N 5/232 348/61 |
| 2015/0077312 A1* | 3/2015 | Wang ................. | G02B 27/017 345/7 |
| 2016/0314729 A1* | 10/2016 | Gutierrez ............. | G09G 3/02 |
| 2017/0108697 A1* | 4/2017 | El-Ghoroury ...... | G02B 27/0081 |
| 2017/0345402 A1* | 11/2017 | Zhou .................. | G06T 7/11 |
| 2017/0353717 A1* | 12/2017 | Zhou .................. | H04N 9/3182 |
| 2017/0372683 A1* | 12/2017 | Du .................... | G09G 5/10 |

FOREIGN PATENT DOCUMENTS

| | | |
|---|---|---|
| CN | 103209333 A | 7/2013 |
| CN | 103281545 | 9/2013 |
| CN | 103581643 A | 2/2014 |
| CN | 103918257 A | 7/2014 |
| CN | 104007552 A | 8/2014 |
| CN | 105866963 A | 8/2016 |
| CN | 106291945 A | 1/2017 |
| CN | 106324847 A | 1/2017 |
| CN | 106412556 A | 2/2017 |
| CN | 206133120 A | 4/2017 |

OTHER PUBLICATIONS

Written Opinion and English translation of Box No. 5 of Written Opinion for International Application No. PCT/CN2017/092018, dated Oct. 11, 2017, 7 pages.

Corresponding Chinese Search Report priority Application No, 201610966210,5, dated Feb. 16, 2017, 15 pages.

* cited by examiner

DISPLAY PANEL AND DISPLAY APPARATUS

CROSS-REFERENCE TO RELATED APPLICATION

This disclosure is a Section 371 National Stage Application of International Application No. PCT/CN2017/092018, filed Jul. 6, 2017, which is not yet published, and claims priority of the Chinese Patent Application No. 201610966210.5 with the title "a display panel and display apparatus", filed with the State Intellectual Property Office of China on Oct. 31, 2016, which is incorporated herein by reference in its entirety.

BACKGROUND OF THE DISCLOSURE

Field of the Disclosure

At least one of the embodiments of the present disclosure relates to the field of display technology, in particular to a display apparatus and a near-eye display device.

DESCRIPTION OF THE RELATED ART

With the appearance on the market of such products as Google Glass, virtual reality (VR) products, augmented reality (AR) helmet, etc., near-eye display technique is more and more applied in the display technology.

A near-eye display device enabling 3D displaying includes generally a left display region corresponding to a left eye of a user and a right display region corresponding to a right eye of the user. When the two (left and right) display regions display different parallax pictures of a same scene, 3D display effect is realized on the basis of human binocular parallax.

SUMMARY OF THE DISCLOSURE

In order to at least partially overcome the abovementioned problem that the monocular focusing distance is not in consistent with the binocular converge distance in the existing near-eye display device or other problems, at least one embodiment of the present disclosure provides a display apparatus and a near-eye display device.

According to an embodiment of an aspect of the present disclosure, a display apparatus is provided, which is to be used for near-eye displaying and comprises a display panel and a driving circuit, the display panel comprising a first display region. The first display region comprises at least two sets of display units, each set of display units comprising at least one display unit, wherein all the display units of the first display region are configured to generate light rays that are to be converged onto a same eye of a user, all the display units that belong to a same set of display units are configured to generate light rays that are to be converged onto a same viewpoint of a same eye of the user, and the display units that belong to different sets of display units are configured to generate light rays that are to be converged respectively onto different viewpoints of a same eye of the user. The driving circuit is configured to drive the display units of the at least two sets of display units, so that the at least two sets of display units display pictures representing a same scene to be displayed and viewed at the respective viewpoints.

In the display apparatus according to an embodiment of the present disclosure, the display panel further comprises a light outputting control layer configured to control colours and directions of the light rays generated by the display units, or to control directions of the light rays generated by the display units.

In the display apparatus according to an embodiment of the present disclosure, the at least two sets of display units are so arranged and the light outputting control layer is so configured that, among viewpoints to which the at least two sets of display units correspond, distances between any two adjacent viewpoints are less than 2.5 mm.

In the display apparatus according to an embodiment of the present disclosure, the driving circuit is configured to produce a driving signal which is to be input into the display units of the at least two sets of display units, so as to drive the display units.

In the display apparatus according to an embodiment of the present disclosure, the driving circuit is configured to produce picture information according to a scene to be displayed, the picture information comprising information representing colour and brightness of pixels of a picture to be displayed, and information representing display distances of the pixels; wherein the driving circuit is further configured to produce a driving signal on the basis of the picture information, so as to drive the display units of the at least two sets of display units.

In the display apparatus according to an embodiment of the present disclosure, the driving circuit is further configured: to divide the picture to be displayed into several sets of pixels on the basis of the display distances according to the picture information produced; to determine the distances between any two display units belonging to two or more sets of display units employed to display each set of pixels in the two or more sets of display units, according to the display distance of each set of pixels; to determine the picture to be displayed by the display units of a set of display units, according to the determined distances between any two display units; and to write a driving signal to which the picture to be displayed corresponds into the display units.

In the display apparatus according to an embodiment of the present disclosure, the at least two sets of display units are so arranged and the light outputting control layer is so configured that the viewpoints to which the sets of display units correspond are arranged in an axisymmetric distribution manner, a central radial distribution manner or a helical radial distribution manner.

In the display apparatus according to an embodiment of the present disclosure, the display panel comprises four sets of display units, wherein the four sets of display units are so arranged and the light outputting control layer is so configured that a connecting line between two viewpoints among the four viewpoints to which the four sets of display units correspond intersects perpendicularly a connecting line between the other two viewpoints, and that the four viewpoints are evenly distributed around an intersection point of the two connecting lines.

In the display apparatus according to an embodiment of the present disclosure, the display units of each set of display units are evenly distributed in the first display region.

In the display apparatus according to an embodiment of the present disclosure, the display unit comprises two or more pixels, which generate light rays with a same direction.

In the display apparatus according to an embodiment of the present disclosure, the display panel further comprises a second display region, the light rays generated by the display units of the first display region and of the second display region are emitted respectively into two eyes of the user, and the first display region and the second display region display respectively binocular parallax pictures representing a same scene to be displayed.

In the display apparatus according to an embodiment of the present disclosure, the display panel comprises two separate display subpanels, on which the first display region and the second display region are respectively situated; or, the first display region and the second display region are two display regions on the display panel.

According to an embodiment of another aspect of the present disclosure, a near-eye display device is provided, which comprises a display apparatus according to any one of the above embodiments.

BRIEF DESCRIPTION OF THE DRAWINGS

In order to describe more clearly the technical solutions of the embodiments of the present disclosure, the drawings necessary for the description of the embodiments will be briefly introduced hereinafter. Obviously, the drawings described below relate to only some of the embodiments of the present disclosure. A person skilled in the art can obtain other drawings on the basis of these drawings without exercising inventive skill.

DETAILED DESCRIPTION OF THE EMBODIMENTS

Figure 1A:
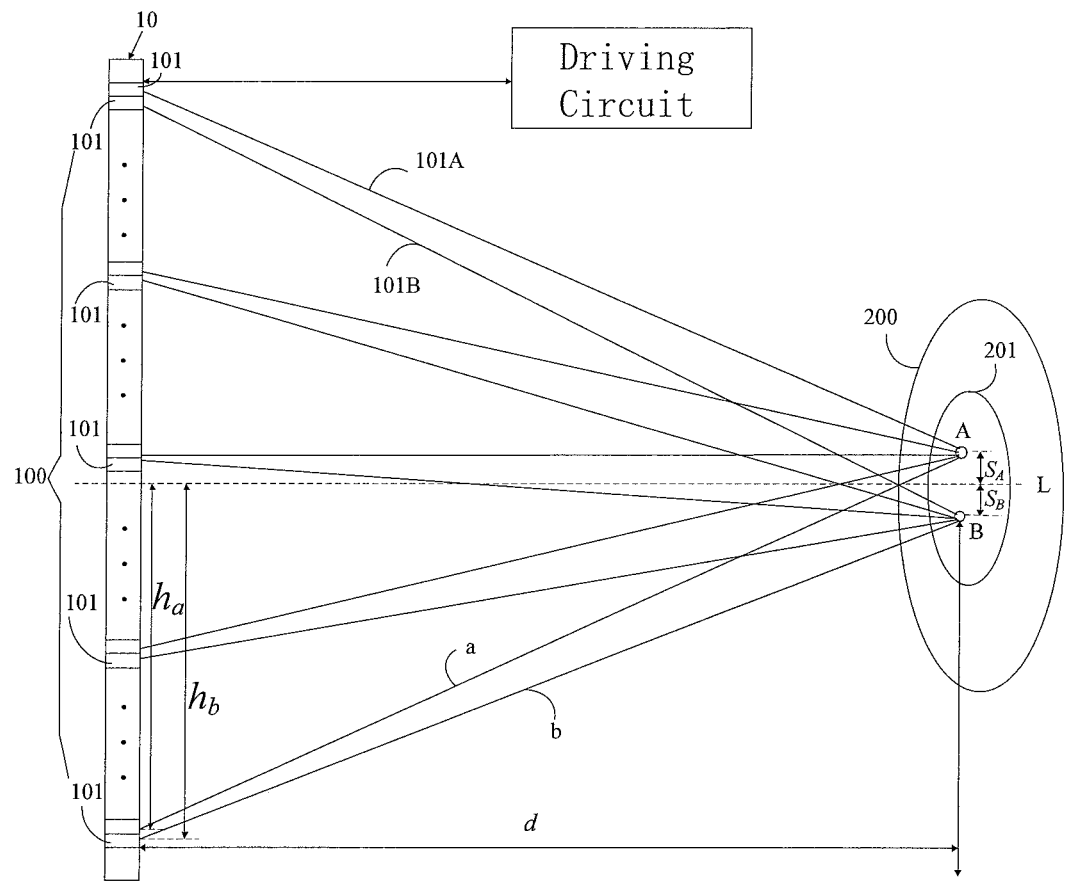
FIG. 1A is a schematic diagram of a display apparatus according to an embodiment of the present disclosure.

In order to make objects, technical solutions and advantages of the present disclosure more evident, the modes for carrying out the present disclosure will be described in more detail hereinafter with reference to the drawings.

In addition, for convenience of explanation in the following detailed description, many particulars are set forth to enable a comprehensive understanding of the embodiments of the present disclosure. It is obvious, however, that one or more embodiments can also be carried out without these particulars. In other instances, well-known structures and apparatus are presented schematically so as to simplify the drawings.

Since this kind of near-eye display device utilizes only binocular parallax, however, all the monocular focusing positions reside on the display screen rather than on the displayed 3D scene. As a result, a problem arises that the monocular focusing distance is not in consistent with the binocular converge distance, but the two distances are the same in the real world, and therefore the wearer will experience various discomforts, such as dizziness.

According to the general concept of the embodiments of the present disclosure, a display apparatus comprising a display panel and a driving circuit is provided, the display panel comprising a first display region, the first display region comprising at least two sets of display units and each set of display units comprising at least one display unit. The number of display units in each set of display units is identical or different. All the display units of the first display region are configured to generate light rays that are to be converged onto a same eye of the user. All the display units that belong to a same set of display units are configured to generate light rays that are to be converged onto a same viewpoint of a same eye of the user, and the display units that belong to different sets of display units are configured to generate light rays that are to be converged respectively onto different viewpoints of a same eye of the user. That is, the light rays generated by the display units that belong to different sets of display units are converged respectively onto at least two viewpoints, instead of a same viewpoint, of a human eye.

The driving circuit is configured to drive the display units of the at least two sets of display units, so that the at least two sets of display units display the pictures representing a same scene to be displayed and viewed at the respective viewpoints. In this case, the at least two sets of display units driven by the driving circuit may comprise all or some of the sets of display units on the display panel. The scene to be displayed corresponds to a 3D image, and the images viewable at each viewpoint are 2D images. For example, the scene to be displayed may include such contents as landscape, objects and persons, and the 2D images viewed at the two viewpoints are respectively the pictures obtained when the scene to be displayed is viewed in two directions.

It shall be understood that a same scene to be displayed refers to a real scene represented by a 3D image. In reality, different pictures emerge when the same scene to be displayed is viewed in each viewpoint of a same eye or by different eyes of a user. Each picture can be respectively imaged on the retina through viewpoints on the pupil of a human eye, and the images on the retina through the viewpoints are combined to a single well-defined image by adjusting the lens to an appropriate focusing status by the human eye, thus enabling the single-eye focusing and 3D display effect.

FIG. 1A is a schematic diagram of a display apparatus according to an embodiment of the present disclosure. It can be understood by a person skilled in the art that, through the description of an embodiment of the present disclosure by taking the dual-viewpoints case as an example in which the display panel comprises two sets of display units, it can be deduced that in the case of multiple viewpoints the display panel comprises multiple sets of display units corresponding respectively to the multiple viewpoints.

Referring to FIG. 1A, according to an exemplary embodiment of the present disclosure, a display panel 10 comprises a first display region, the first display region comprises two sets of display units 100, and each set of display units 100 comprises at least one display unit 101. All the display units 101 of the first display region are configured to generate light rays 101A and 101B that are to be converged respectively onto two viewpoints of a same eye 200 of the user, and the light rays 101A and 101B reach respectively the viewpoints A and B on (or near) the pupil (reference number 201 in FIG. 1A) of the eye. The display units 101 of the first display region are equally distributed in the two sets of display units 100, and the display units 101 belonging respectively to the two sets of display units 100 are alternately distributed (but this is not limiting). The sets of display units 100 corresponding respectively to the two viewpoints A and B generate respectively different pictures representing a same scene to be displayed. It shall be noted that the black dots shown in the display panel of FIG. 1A represent display units 101 not specifically shown.

Figure 1B:
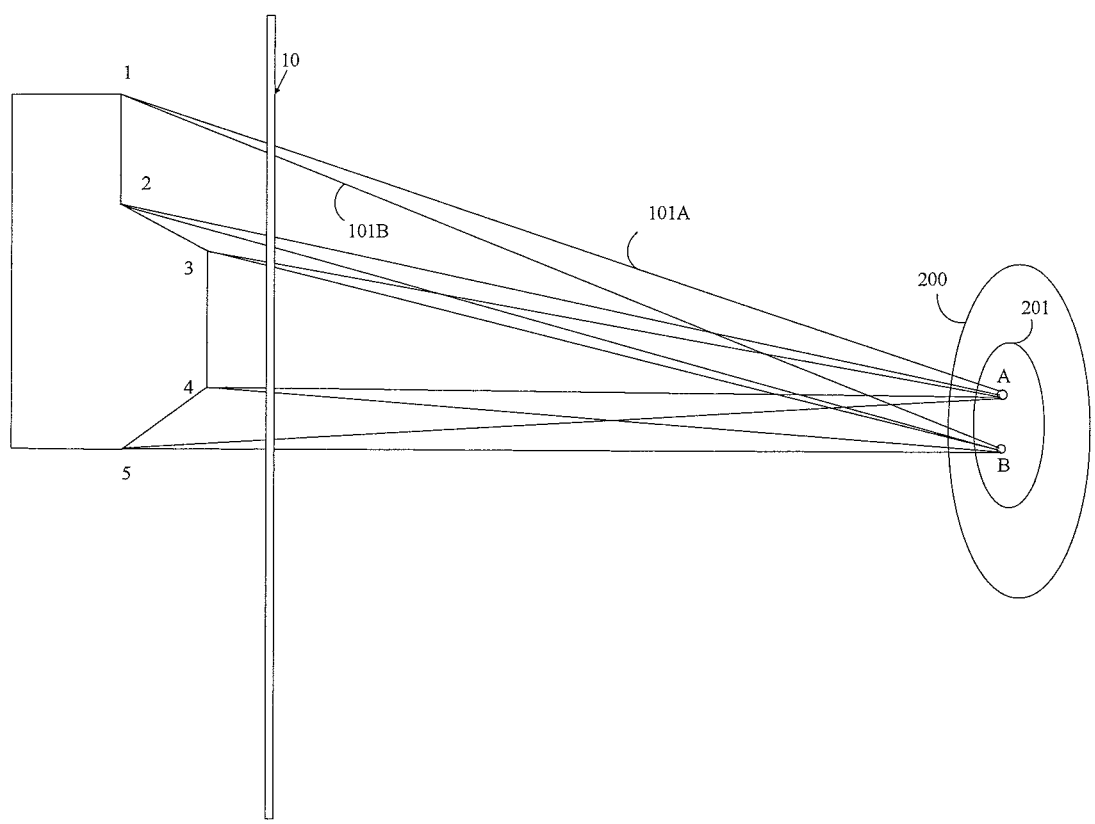
FIG. 1B is a schematic diagram showing the principle of 3D image generation of a display apparatus according to an embodiment of the present disclosure.

FIG. 1B is a schematic diagram showing the principle of 3D image generation of a display apparatus according to an embodiment of the present disclosure. The 3D image shown in this figure comprises five dots denoted by 1 to 5. Five display units 101 on the display panel 10 that belong to two sets of display units 100 display respectively these five dots, and a human eye sees these five dots through two viewpoints A and B. Each of the 2D images viewed at each viewpoint A or B may be respectively imaged on a retina through the two viewpoints on the pupil of a human eye, and the images on the retina through multiple viewpoints are combined to a single well-defined image by adjusting the lens to an appropriate focusing status by the human eye, thus forming a 3D image.

In the 3D image shown in FIG. 1B, the display distances of the three dots 1, 2 and 5 are equal, and the distance between the two display units within the two sets of display units 100 for displaying the dot denoted by 1, the distance between the two display units for displaying the dot denoted by 2 and the distance between the two display units for displaying the dot denoted by 5 are equal. Likewise, the distance between the two display units within the two sets of display units 100 for displaying the dot denoted by 3 and the distance between the two display units for displaying the dot denoted by 4 are equal. The distance between the two display units within the two sets of display units 100 for displaying the dot denoted by 1 and the distance between the two display units for displaying the dot denoted by 2 are unequal.

For example, when a single display unit 101 is concerned, viewpoints refer to the sites, at which the light rays 101A or 101B reach, at or near the pupil (reference number 201 in FIG. 1A) of a human eye; when a whole display panel is concerned, viewpoints refer to each converging point at or near the pupil (reference number 201 in FIG. 1A) of a human eye, formed by the light rays 101A or 101B coming from the whole display panel. A viewpoint defined above may be a point or a region on the pupil. By providing, in the first display region of the display panel according to the embodiments of the present disclosure, at least two sets of display units 100 corresponding respectively to at least two viewpoints on a human eye, the at least two sets of display units 100 generate respectively different pictures representing a same scene to the displayed and viewable at at least two viewpoints, and converge respectively these pictures onto the at least two viewpoints. By the abovementioned way of displaying the pictures, these pictures form a common image (a image identical to that formed on the retina when the human eye observes in a realistic environment a real scene corresponding to the scene to be displayed) on the retina by imaging with the optical system of the human eye when the lens of the human eye is in a certain converging status (a status that a human eye has when observing in a realistic environment a real scene corresponding to the scene to be displayed), thus realizing the single-eye focusing and 3D display effect. The human eyes can realize a selective focusing of the scene to be displayed by changing the focusing status of the lens, enabling a selective viewing with different distances, different orientations and different depths of field. In this case, the selective focusing may be a selective focusing of different locations of two pictures, or a selective focusing of two pictures among several pictures. In addition, the single-eye focusing takes place then on the displayed 3D scene rather than on the display screen. As a result, in combination with the binocular parallax 3D technology, the display apparatus according to the embodiments of the present disclosure can at least partially resolve the problem of the inconsistence between the monocular focusing distance and the binocular converge distance in the binocular parallax 3D technology, thereby significantly lowering the possibility of discomforts, such as dizziness, experienced by the wearer.

The display units 101 according to the embodiments of the present disclosure are all directive display units. By directive display units it is meant that the display units are configured to be able to generate light rays with given angles with respect to the display panel.

Figure 2:
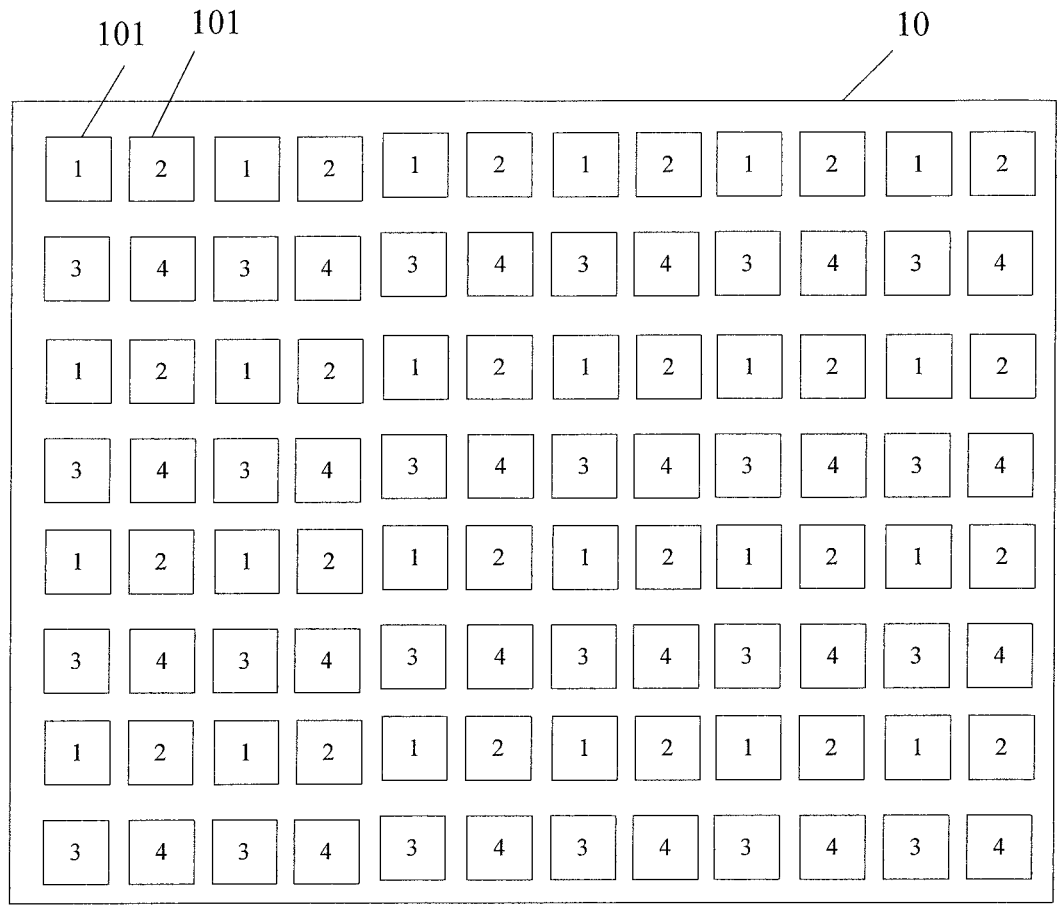
FIG. 2 is a schematic diagram showing distribution of display units according to an embodiment of the present disclosure.

In an embodiment, the display units 101 of each set of display units 100 are evenly distributed in the first display region, each set of display units 100 corresponding to a viewpoint. By evenly distributed it is meant that the first display region is divided into several sub-regions, and the display units 101 belonging to a same set of display units 100 are evenly arranged in each sub-region. For example, two adjacent display units 101 may belong respectively to two sets of display units 100 corresponding to different viewpoints, or belong to a single set of display units 100 corresponding to a same viewpoint. Generally, the display units 101 belonging to different sets of display units 100 may be arranged in alternated pattern. Referring to FIG. 2 (taking the case of four viewpoints as example), in an exemplary embodiment, the display units 101 denoted by 1 to 4 belong respectively to the sets of display units 100 corresponding to four different viewpoints. The display units 101 of each set of display units 100 are evenly distributed in the first display region, and in this way each set of display units can form pictures with the same size.

In the embodiments of the present disclosure, the driving circuit is configured to drive the display units 101 on the display panel to display pictures, so that multiple sets of display units 100 display respectively the pictures representing a same scene to be displayed and viewable at the multiple viewpoints corresponding to the multiple sets of display units 100.

The driving circuit of the display apparatus according to the embodiments of the present disclosure involves the following two driving manners.

In the first driving manner, the driving circuit is configured to produce a driving signal which is to be input into the display units 101 of the at least two sets of display units 100, so as to drive the display units 101. The driving signal input into the display units 101 functions as driving voltage for driving the pixels of the display units 101.

In such a first driving manner, it is possible to either display simultaneously the pixels in a picture which have different display distances, or display in a time-division way each time the pixels having a same display distance.

In the second driving manner, the driving circuit is configured to produce picture information, the picture information including information representing colour and brightness of pixels of a picture to be displayed, and information representing display distances of the pixels; the driving circuit further produces a driving signal on the basis of the picture information, so as to drive the display units 101 of the at least two sets of display units 100.

In the embodiments of the present disclosure, a display distance refers to the distance from a point in a 3D image viewed by a human eye to the human eye.

In an embodiment, the driving circuit is configured: to divide a picture to be displayed into several sets of pixels on the basis of display distances according to the picture information produced; to determine the distances (abbreviated hereinafter as the distances between the corresponding display units 101, the distances between any two corresponding display units 101 of all pixels among each set of pixels are the same) between any two display units 101 among the two or more display units 101 employed to display each set of pixels in two or more sets of display units 100, according to the display distance of each set of pixels; to determine the picture to be displayed by the display units 101 of a set of display units 100, according to the distances between any two display units 101 employed to display each set of pixels, and to write a driving signal corresponding to the picture to be displayed into the display units 101.

In the second driving manner, the driving circuit determines the picture that the display units 101 of a set of display units 100 shall display, on the basis of the information, among the picture information, for describing the display distances of pixels. For example, in case where two sets of display units 100 are utilized to display a set of pixels, the picture that the display units 101 of a first set of display units shall display may be determined on the basis of the picture to be displayed, then the display units 101 within a second set of display units to which the display units 101 of the first set of display units correspond are determined on the basis of the display distances. The display units 101 within the second set of display units to which the display units 101 of the first display units correspond and the display units 101 of the first display units display the same pictures.

Similarly to the first driving manner, the second driving manner also comprises two display modes: the first mode is time-division display mode, in which pixels with different display distances are displayed at different times, and a 3D image within a certain range of depth of field is obtained by superimposition of the pixels with different display distances; and the second mode is simultaneous display mode, in which a 3D image within a certain range of depth of field is displayed at the same time.

In the first display mode, the display panel displays at a same time point only the pixels with a same display distance, and all the pixels may be displayed by several times of displaying. As a result, the display resolution is higher, but the speed of response is lower. In the second display mode, the display panel displays at a same time point all the pixels of the picture to be displayed, and therefore the speed of response is higher, but the display resolution is somewhat lowered (this may be possible only when some pixels are omitted).

Figure 3:
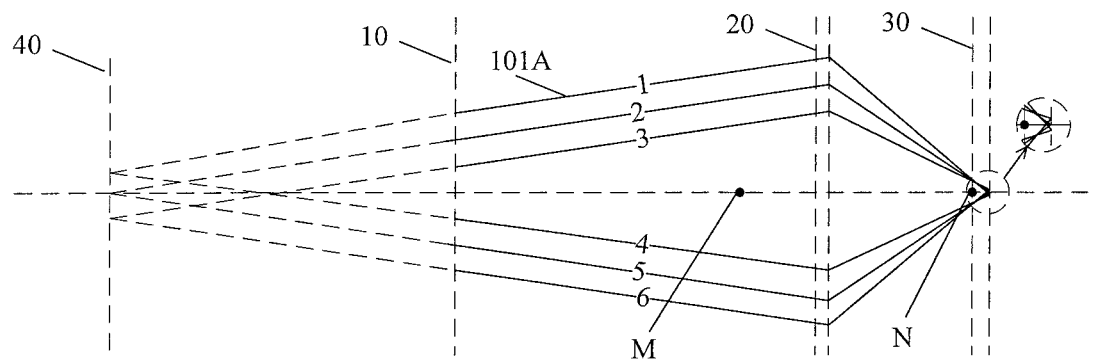
FIG. 3 is a schematic diagram showing optical path distribution of a display panel according to an embodiment of the present disclosure.

Since the display panel displays at a same time point only the pixels with a same display distance in the first display mode, two display units are identified on the display panel after the distance between these two display units 101 is determined and on the basis of this distance and the position distribution of the pixels to be displayed. As shown in FIG. 3, as an example in which two sets of display units are utilized to display a set of pixels, light rays 1 and 4 are emitted by two corresponding display units (for displaying a same pixel in the image to be displayed), light rays 2 and 5 are emitted by two corresponding display units, and light rays 3 and 6 are emitted by two corresponding display units. After passing through a human eye 20, the three groups of light rays converge onto a same equidistant image plane 30 in the eye, and it is perceived that the object points to which these points correspond are also on a same object plane 40.

In FIG. 3 an object focus M and an image focus N are shown, which are not to be described here in detail.

Figure 4:
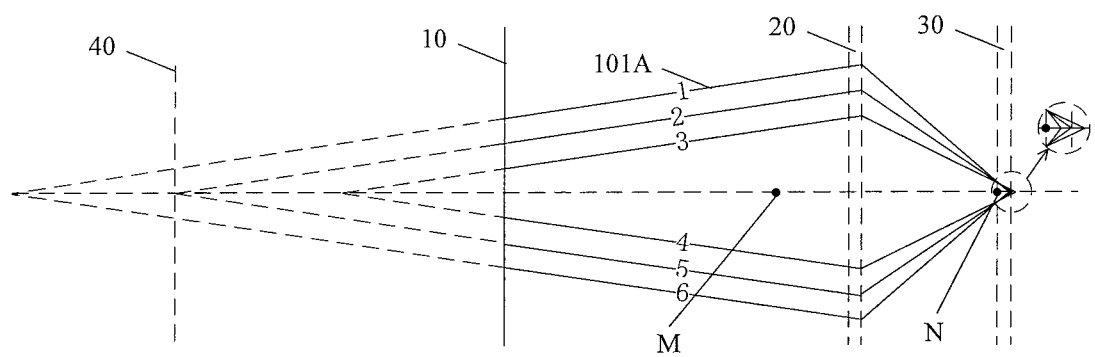
FIG. 4 is a schematic diagram showing optical path distribution of a display panel according to another embodiment of the present disclosure.

In the second display mode, the display panel displays at a same time point pixels with various display distances, and therefore the display units 101 shall be configured to have various distances. As shown in FIG. 4, light rays 1 and 6 are emitted by two corresponding display units, light rays 2 and 5 are emitted by two corresponding display units, and light rays 3 and 4 are emitted by two corresponding display units. The circumstance shown in FIG. 4 is only an example in which pixels with different display distances are displayed on a position of the display panel. Pixels with different display distances may be displayed on each position of the display panel, thus forming a complete image.

It shall be noted that, when the distance between two display units of a same pixel in an image to be displayed is fixed, the distance from the displayed virtual object point to a human eye is also fixed (with the assumption that the lens of the human eye is an ideal lens. In a real instance a corresponding adjustment may be made according to the real model of the human eye. In addition, since the field angles, with respect to the lens of a human eye, of the light rays from different virtual object points corresponding to a same object distance differ in different directions, the distance between the abovementioned two display units may be slightly adjusted in the light of actual conditions so as to optimize the display effects), and then the pixels with the same display distances in the image to be displayed are formed. As for the selection of the corresponding display units 101, the angle between the light rays coming from the corresponding display units 101 is generally less than 1 degree.

Since the display distances of the pixels in the image to be displayed and the distances between the corresponding display units 101 are correlated, in the embodiments of the present disclosure, the distances between the corresponding display units 101 are within a given range.

Further, a given range of the distances between the corresponding display units 101 is 0.1 to 2.5 mm. By selecting different values from the range of distances, regulation and control of the display distances are realized.

As for the display panel with multiple sets of display units 100, the multiple sets of display units 100 may function either to display at the same time pixels with a same display distance in the image to be displayed, or to display respectively at different times pixels with different display distances.

Further, in case where the display panel 10 comprises multiple sets of display units 100, the viewpoints to which the multiple sets of display units 100 correspond may be arranged in an axisymmetric distribution manner, a central radial distribution manner or a helical radial distribution manner, so that the viewpoints can be close to the centre of the pupil of a human eye when the user is watching. The axisymmetric distribution may involve vertical symmetry or horizontal symmetry. Central radial distribution means that the viewpoints are distributed on several concentrically arranged circles, and viewpoints are distributed evenly on each circle. Helical radial distribution means that viewpoints are arranged helically from inside to outside.

For example, in case where the display panel 10 comprises four sets of display units 100, a connecting line between two viewpoints among the four viewpoints to which the four sets of display units 100 correspond intersects perpendicularly a connecting line between the other two viewpoints, and the four viewpoints are evenly distributed around an intersection point of the two connecting lines. A display panel comprising four sets of display units can be easily designed, and can meet the demand in term of viewing by a human eye. In addition, with the viewpoints distribution of the four sets of display units 100 designed in this way, the four viewpoints are evenly distributed near the centre of the pupil of a human eye, thus avoiding the mutual interference due to overconcentration of the viewpoints.

In the embodiments of the present disclosure, since the maximal pupil diameter of a human eye is about 2.5 mm under normal lighting conditions, the distances between any two adjacent viewpoints shall be less than 2.5 mm to ensure that pictures enter into the pupil at at least two viewpoints at a same time point.

The light outputting direction of each display unit 101 may be designed individually. Referring to FIG. 1A, taking the case of two viewpoints as an example, the distance from the pupil of the human eye to the display panel is d, the display panel converges the light rays into two points A and B near the pupil, and the distances from points A and B to the centre of the pupil are respectively $S_A$ and $S_B$. The light rays a and b coming from two corresponding display units on the display panel are converged respectively into the viewpoints A and B, and the distances between these two display units and the perpendicular line L connecting the pupil and the display panel are respectively $h_a$ and $h_b$. Then, the slant angles of the light rays coming from these two display units with respect to the perpendicular line L connecting the pupil and the display panel are respectively arc $\tan((h_a - S_A)/d)$ and arc $\tan((h_b + S_B)/d)$.

In the embodiments of the present disclosure, in order to control the light coming from each display unit in the display panel, the display panel comprises a light outputting control layer configured to control the colours and directions of the light rays generated by the display units 100 of the display panel, so that the light rays coming from the display units 100 reach the respective viewpoints of a human eye with the given colours and in the given directions; or to control the directions of the light rays generated by the display units of the display panel. For example, the light outputting control layer may comprise a grating structure, a grating waveguide coupling structure or a microlens array. The control of the colour of light rays takes place generally by virtue of the colour filter of the display panel or by virtue of the display units, but in the embodiments of the present disclosure it can also be realized by means of a light outputting control layer.

In an embodiment, the display panel may involve a liquid crystal display panel. In this case, the grating structure may be disposed on the backlight portion of the liquid crystal display panel, to control the display units of the display panel in such a way that the light with given colour is emitted from a given position in a given direction, or to control the display units of the display panel in such a way that the light is emitted from a given position in a given direction. The display panel 10 may involve a liquid crystal display panel or an organic light emitting diode display panel. In this case, the grating structure may be disposed on the liquid crystal display panel or on the organic light emitting diode display panel. In order to reduce the thickness of the display panel, a side-type backlight source may be employed as a backlight apparatus in the abovementioned liquid crystal display panel.

In the embodiments of the present disclosure, the display units 101 comprise at least one pixel. The display units 101 may comprise many pixels, but may also comprise fewer pixels. In case where the display units comprise fewer pixels, more display units are provided to constitute a set of display units, so as to meet the demand for displaying.

Further, in case where the display unit 101 comprises two or more pixels, the light rays generated by the two or more pixels have the same direction.

In an embodiment, each pixel comprises three sub-pixels. The arrangement modes of the sub-pixels of the display panel may include: conventional arrangement mode for strip electrodes (in which the three sub-pixels of each pixel are arranged in a same row, and each sub-pixel may have a shape of elongated strip, the longitudinal direction of the elongated strip being the same as or perpendicular to the row direction), the arrangement mode of triangular lattice (in which the three sub-pixels are arranged at the three vertexes of a triangle), BV3 arrangement mode (a kind of arrangement mode of triangular lattice, in which the shape and spacing or the like of the sub-pixels are so adjusted that the adjacent sub-pixels with a same colour form regular triangles), etc.

Figure 5:
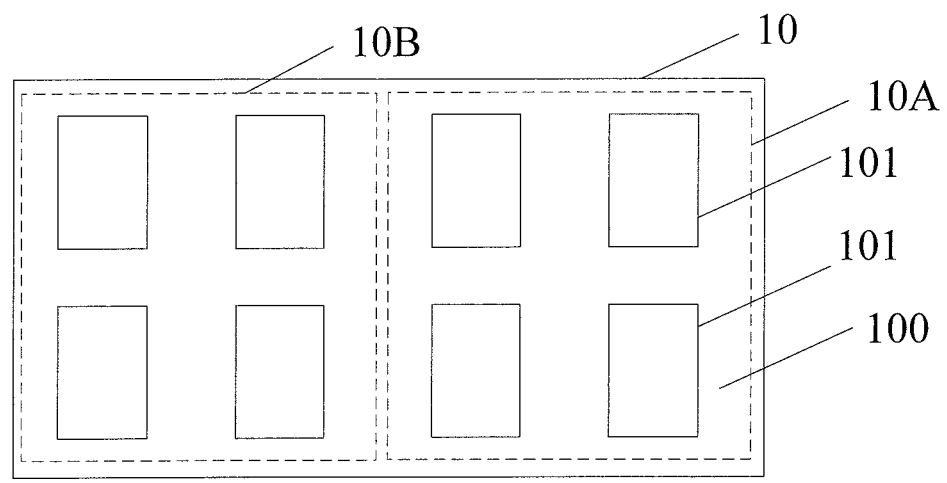
FIG. 5 is a schematic diagram showing distribution of display units of a display panel according to another embodiment of the present disclosure.
Figure 6:
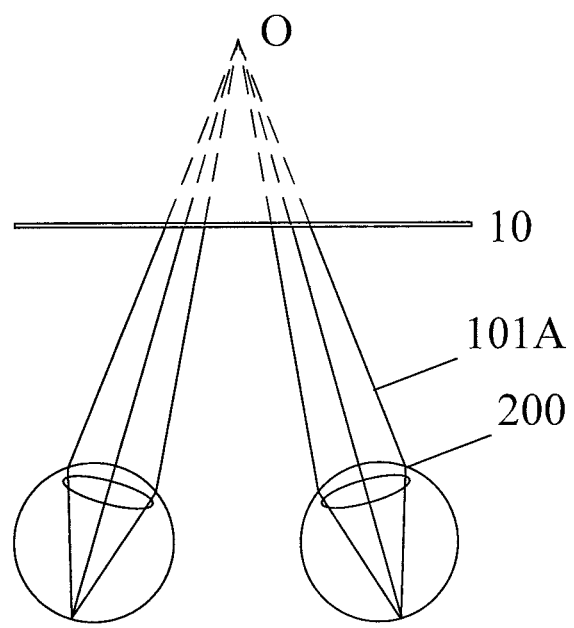
FIG. 6 is a schematic diagram showing optical path distribution of the display panel shown in FIG. 5.

FIG. 5 is a schematic diagram showing the distribution of the display units of a display panel according to another embodiment of the present disclosure; and FIG. 6 is a schematic diagram showing the optical path distribution of the display panel shown in FIG. 5. Referring to FIG. 5, the display panel 10 comprises a first display region 10A and a second display panel 10B, and the light rays generated by the display units 101 of the first display region 10A and of the second display panel 10B are emitted respectively into the two eyes 200 of the user (cf. the optical path diagram of FIG. 6). Each display unit 101 of the first display region 10A corresponds one by one to each display unit 101 of the second display region 10B, and the first display region 10A and the second display region 10B display respectively binocular parallax pictures representing a same scene to be displayed, that is, different pictures of a same scene that can be viewed by the two eyes. Coincidence of the monocular focusing position and the binocular sights converge position is enabled by adjusting the displayed pictures, and the problem of dizziness of the user due to significant difference between the monocular focusing position and the binocular sights converge position in the existing parallax 3D technology is thereby avoided.

Since the two eyes of a person are in different positions and the viewing directions differ when a same scene is observed, the pictures viewable by the two eyes are different. As for a display panel, the two display regions display correspondingly the pictures viewed by the two eyes, and the pictures displayed by the two display regions may be those taken by correspondingly arranged cameras.

In an embodiment, the display panel comprises two separate display subpanels, on which the first display region 10A and the second display region 10B are respectively situated. In an alternative embodiment, the first display region 10A and the second display region 10B are two display regions on the display panel.

According to an embodiment of another aspect of the present disclosure, a near-eye display device is provided, which comprises a display apparatus according to any one of the above embodiments.

This near-eye display device may be any products or components having near-eye 3D display function, such as virtual/augmented reality head-mounted display apparatus.

Since the near-eye display device provided by the embodiment of the present disclosure has the same technical features as any one of the abovementioned display apparatuses, it can solve the same technical problem and produce the same technical effects.

In the display apparatus and the near-eye display device according to the above embodiments of the present disclosure, by providing at least two sets of display units in the first display region, all the display units that belong to different sets of display units are configured to be able to generate light rays that are to be converged respectively onto different viewpoints of a same eye of a user; the driving circuit drives the display units of the at least two sets of display units, so that the at least two sets of display units of the display panel display the pictures representing a same scene to be displayed and viewable at the respective viewpoints. The pictures that belong to different sets of display units can be imaged on the retina of a human eye through different viewpoints, and by adjusting the focusing to an appropriate extent by the lens of a human eye, the images can form a well-defined retina image, enabling the single-eye focusing and 3D display effect. In this case, the single-eye focusing takes place on the displayed 3D scene rather than on the display screen, a fact that, in combination with the parallax 3D technology, enables the coincidence of the monocular focusing position and the binocular sights converge position. The problem of the inconsistence between the monocular focusing distance and the binocular converge distance is thereby at least partially avoided, and therefore the wearer will not experience discomforts, such as dizziness.

The foregoing is only the preferred embodiments of the present disclosure and is not intended to limit the present disclosure. Any alterations, equivalent replacements and improvements within the spirit and principle of the present disclosure shall be included in the protection scope of the present disclosure.

What is claimed is:

1. A display apparatus, which is to be used for near-eye displaying and comprises:
   a display panel comprising a first display region, wherein the first display region comprises at least two sets of display units, each set of display units comprising at least one display unit; all the display units of the first display region are configured to generate light rays that are to be converged onto a same eye of a user, all the display units that belong to a same set of display units are configured to generate light rays that are to be converged onto a same viewpoint of a same eye of the user, and the display units that belong to different sets of display units are configured to generate light rays that are to be converged respectively onto different viewpoints of a same eye of the user; and
   a driving circuit, configured to drive the display units of the at least two sets of display units, so that the at least two sets of display units display pictures representing a same scene to be displayed and viewed at the respective viewpoints,
   wherein the display panel further comprises a light outputting control layer configured to control colours and directions of the light rays generated by the display units, or to control directions of the light rays generated by the display units,
   wherein the display panel comprises four sets of display units, and the four sets display units are so arranged and the light outputting control layer is so configured that a connecting line between two viewpoints among the four viewpoints to which the four sets of display units correspond intersects perpendicularly a connecting line between the other two viewpoints, and the four viewpoints are evenly distributed around an intersection point of the two connecting lines.

2. The display apparatus of claim 1, wherein the at least two sets of display units are so arranged and the light outputting control layer is so configured that, among viewpoints to which the at least two sets of display units correspond, distances between any two adjacent viewpoints are less than 2.5 mm.

3. The display apparatus of claim 2, wherein the driving circuit is configured to produce a driving signal which is to be input into the display units of the at least two sets of display units, so as to drive the display units.

4. The display apparatus of claim 2, wherein the driving circuit is configured to produce picture information according to a scene to be displayed, the picture information comprising information representing colour and brightness of pixels of a picture to be displayed, and information representing display distances of the pixels; wherein the driving circuit is further configured to produce a driving signal on the basis of the picture information, so as to drive the display units of the at least two sets of display units.

5. The display apparatus of claim 4, wherein the driving circuit is further configured:
   to divide the picture to be displayed into several sets of pixels on the basis of the display distances according to the picture information produced;
   to determine distances between any two display units belonging to two or more sets of display units employed to display each set of pixels in the two or more sets of display units, according to the display distances of each set of pixels;
   to determine the picture to be displayed by the display units of a set of display units, according to the determined distances between any two display units; and
   to write a driving signal to which the picture to be displayed corresponds into the display units.

6. The display apparatus of claim 2, wherein the display units of each set of display units are evenly distributed in the first display region.

7. The display apparatus of claim 2, wherein the display panel further comprises a second display region, the light rays generated by the display units of the first display region and of the second display region are emitted respectively into the two eyes of the user, and the first display region and the second display region display respectively binocular parallax pictures representing a same scene to be displayed.

8. The display apparatus of claim 7, wherein the display panel comprises two separate display subpanels, on which the first display region and the second display region are respectively situated; or, the first display region and the second display region are two display regions of the display panel.

9. The display apparatus of claim 1, wherein the driving circuit is configured to produce a driving signal which is to be input into the display units of the at least two sets of display units, so as to drive the display units.

10. The display apparatus of claim 1, wherein the driving circuit is configured to produce picture information according to a scene to be displayed, the picture information comprising information representing colour and brightness of pixels of a picture to be displayed, and information representing display distances of the pixels; wherein the driving circuit is further configured to produce a driving signal on the basis of the picture information, so as to drive the display units of the at least two sets of display units.

11. The display apparatus of claim 10, wherein the driving circuit is further configured:
   to divide the picture to be displayed into several sets of pixels on the basis of the display distances according to the picture information produced;
   to determine distances between any two display units belonging to two or more sets of display units employed to display each set of pixels in the two or more sets of display units, according to the display distances of each set of pixels;

to determine the picture to be displayed by the display units of a set of display units, according to the determined distances between any two display units; and to write a driving signal to which the picture to be displayed corresponds into the display units.

12. The display apparatus of claim 1, wherein the at least two sets of display units are so arranged and the light outputting control layer is so configured that the viewpoints to which the sets of display units correspond are arranged in an axisymmetric distribution manner, a central radial distribution manner or a helical radial distribution manner.

13. The display apparatus of claim 1, wherein the display units of each set of display units are evenly distributed in the first display region.

14. The display apparatus of claim 1, wherein the display unit comprises two or more pixels, which generate light rays with a same direction.

15. The display apparatus of claim 1, wherein the display panel further comprises a second display region, the light rays generated by the display units of the first display region and of the second display region are emitted respectively into the two eyes of the user, and the first display region and the second display region display respectively binocular parallax pictures representing a same scene to be displayed.

16. The display apparatus of claim 15, wherein the display panel comprises two separate display subpanels, on which the first display region and the second display region are respectively situated; or, the first display region and the second display region are two display regions of the display panel.

17. A near-eye display device comprising a display apparatus according to claim 1.

* * * * *